United States Patent [19]

Tagawa et al.

[11] Patent Number: 5,140,598
[45] Date of Patent: Aug. 18, 1992

[54] FIBER OPTIC AMPLIFIER

[75] Inventors: Kenji Tagawa; Shinya Inagaki, both of Tokyo; Keiko Takeda, Yokohama, all of Japan

[73] Assignee: Fujitsu Limited, Kawasaki, Japan

[21] Appl. No.: 701,868

[22] Filed: May 17, 1991

[30] Foreign Application Priority Data

May 18, 1990 [JP] Japan .................. 2-126859
May 18, 1990 [JP] Japan .................. 2-126860

[51] Int. Cl.⁵ .............................................. H01S 3/30
[52] U.S. Cl. ................................. 372/6; 372/70; 372/68; 372/703
[58] Field of Search ............. 372/6, 92, 94, 39, 41, 372/69, 68, 70, 703

[56] References Cited

U.S. PATENT DOCUMENTS 4,835,778 5/1989 Kafka et al. .................. 372/6
4,962,995 10/1990 Andrews et al. .............. 372/6

FOREIGN PATENT DOCUMENTS 1-61076 3/1989 Japan .
1-143380 6/1989 Japan .

*Primary Examiner*—Léon Scott, Jr.
*Attorney, Agent, or Firm*—Staas & Halsey

[57] ABSTRACT

An optical fiber doped with Er is provided at its both end portions with a pair of 1.25 μm band reflecting filters such that the distance therebetween becomes the resonator length for a light beam of 1.25 μm band. When a pumping light beam of a wavelength of 0.8 μm band is introduced into the optical fiber, laser oscillation at 1.25 μm band is produced, whereby the energy level of Er in an excited state is lowered and a signal light beam of a wavelength of 1.55 μm band can be optically amplified with high efficiency. Another fiber optic amplifier in which a pair of 0.98 μm band reflecting filters are disposed at both end portions of an optical fiber doped with Yb and Er such that the distance therebetween becomes the resonator length for a light beam of 0.98 μm band is also disclosed.

8 Claims, 5 Drawing Sheets

FIBER OPTIC AMPLIFIER

FIELD OF THE INVENTION

The present invention relates to a fiber optic amplifier in which a signal light beam and a pumping light beam are introduced into an optical fiber doped with a rare earth element to thereby achieve direct amplification of the signal light.

BACKGROUND OF THE INVENTION

In fiber-optics communication systems in practice today, repeaters are inserted in the transmission line at regular intervals to compensate for attenuation of the optical signal due to loss in the optical fiber. In a repeater, an optical signal is converted into an electrical signal by a photodiode and amplified by an electronic amplifier, and, then, converted into an optical signal to be delivered into the fiber-optic transmission line again. If the optical signal as it is could be amplified with noise suppressed, a small sized and economized optical repeater would be attained.

Accordingly, research in optical amplifiers capable of directly amplifying an optical signal are being conducted extensively. The amplifiers being objects of such research can be broadly classified into three categories: (a) that formed of an optical fiber doped with a rare earth element (Er, Nb, Yb, etc.) and a pumping light beam in combination, (b) that constituted of a semiconductor laser doped with a rare earth element, and (c) that utilizing nonlinearity in an optical fiber such as a stimulated Raman amplifier and a stimulated Brillouin amplifier.

Of these, the amplifier formed of an optical fiber doped with a rare earth element (hereinafter referred to as "doped optical fiber") and a pumping light beam in combination has such excellent features that it has no dependency on polarized waves, produces low noise, and can be coupled with a transmission line producing small loss. Therefore, it is expected from this type of amplifier that the relayed communication range can be greatly increased and an optical signal can be distributed into multiple lines.

FIG. 1 shows the principle of optical amplification using an Er doped optical fiber. Reference numeral 2 denotes an optical fiber consisting of a core 4 and a clad 6, with the core 4 doped with erbium (Er). If a pumping light beam is introduced into such Er doped optical fiber 2, Er atoms are excited to a higher energy level. Then, if an introduced signal light beam impinges on the Er atoms in the optical fiber 2 excited to the high level, the Er atoms undergo a transition to a lower energy level and stimulated emission of radiation occures. Thereby, power of the signal light beam progressively increases as it passes through the optical fiber and amplification of the signal light beam is achieved.

An example of a conventional fiber optic amplifier utilizing the described principle is shown in FIG. 2. Reference numeral 10 denotes an Er doped fiber doped with Er. A signal light beam of a wavelength of 1.55 $\mu$m band is introduced into the Er doped fiber 10 from a signal light input end 12 and through an optical isolator 14 and a pumping light beam emitted from a pumping light source 16 is also introduced therein through an optical isolator 18 and a multiplexing coupler 20. By making power of the pumping light sufficiently great, Er atoms within the Er doped fiber 10 can be excited to a higher energy level, so that, by the introduced signal light with the wavelength of 1.55 $\mu$m band, stimulated emission of light with the same wavelength takes place and an amplified signal light beam is emitted from a signal light output end 24 through the multiplexing coupler 20 and an optical isolator 22. As the pumping light source 16, a semiconductor laser emitting a laser beam of 1.48 $\mu$m or a semiconductor laser emitting a laser beam of 0.83 $\mu$m being easily obtainable has been in use.

Functions performed when a semiconductor laser of a wavelength of 0.83 $\mu$m is used as the pumping light source for an Er doped fiber 10 will be described below with reference to an energy level diagram of FIG. 3.

The Er atoms in the ground level ($^4I_{15/2}$), upon impinging thereon of the pumping light beam of a wavelength of 0.83 $\mu$m, are excited to the energy level $^4I_{9/2}$ of the wavelength of 0.83 $\mu$m and immediately undergo transition to the energy level $^4I_{13/2}$ of the wavelength of 1.55 $\mu$m. With the Er atoms in such excited state, if a signal light beam with a wavelength 1.55 $\mu$m is allowed to impinge thereon, stimulated emission of a light beam of the wavelength 1.55 $\mu$m takes place as shown by the arrow A whereby the signal light beam is amplified. However, a portion of the Er atoms changed from the 0.83 $\mu$m level to the 1.55 $\mu$m level is further excited to the energy level $^4S_{3/2}$ of a wavelength 0.51 $\mu$m by the energy of the pumping light beam of the wavelength 0.83 $\mu$m. Thereupon, transition from this level $^4S_{3/2}$ to the ground level takes place. Because of this phenomenon, the population in the level $^4I_{13/2}$ corresponding to the energy of the wavelength 1.55 $\mu$m decreases, and this presents a problem that the amplification characteristics are adversely affected thereby.

Meanwhile, a semiconductor laser emitting a laser beam of a wavelength 1.48 $\mu$m is frequently used as the pumping light source, but since the light of the wavelength 1.48 $\mu$m is close in wavelength to the transmitting signal light of the wavelength 1.55 $\mu$m, it is not possible to obtain a large amplification factor. Therefore, in view of the fact that absorption by the Er doped fiber occurs at 0.98 $\mu$m band in addition to the 1.55 $\mu$m band, research in the attempt to amplify a signal light of the 1.55 $\mu$m band using a pumping light beam of that wavelength is being made. However, since a suitable light source oscillating a laser beam of the 0.98 $\mu$m band is not available, there is proposed a fiber optic amplifier using a semiconductor laser oscillating a laser beam of a wavelength of 0.83 $\mu$m as the pumping light source and amplifying the signal light of the 1.55 $\mu$m band in the following way.

An optical fiber doped with ytterbium (Yb) and an optical fiber doped with erbium (Er) joined by splicing or an optical fiber with its core doped with Yb and Er simultaneously is used, and the laser beam of the wavelength 0.83 $\mu$m is used for exciting Yb and fluorescent light thereby emitted is absorbed by Er so that Er is brought to its excited state. When a signal light beam of the wavelength 1.55 $\mu$m is allowed to impinge on the Er atoms excited as described above, a light beam of the same wavelength is generated by stimulated emission and thus the signal light can be directly amplified.

In this prior art method, while Er is excited by causing it to absorb the fluorescent light generated by exciting Yb with the laser beam of the wavelength 0.83 $\mu$m, the fluorescent light produced by exciting Yb includes not only the 0.98 $\mu$m band but also radiation of other wavelengths. Accordingly, the radiation of wavelengths not absorbed by Er become wasted, and it has been a problem with this method that the energy of the pumping light for exciting Yb is not used effectively.

SUMMARY OF THE INVENTION

It is an object of the present invention to provide a fiber optic amplifier in which the energy of the pumping light is adapted to effectively contribute to excitation of Er.

Another object of the present invention is to provide a fiber optic amplifier having a high amplification efficiency.

In accordance with an aspect of the present invention, there is provided a fiber optic amplifier for directly amplifying a signal light beam of a wavelength of 1.55 μm band by introducing a pumping light beam of a wavelength of 0.8 μm band into an optical fiber doped with Er, the fiber optic amplifier comprising a pair of 1.25 μm band reflecting filters disposed at both end portions of the optical fiber such that the distance therebetween becomes the resonator length for a light beam of 1.25 μm band, whereby laser oscillation at 1.25 μm band is produced so that the energy level of Er in the excited state is lowered.

By means of the pair of 1.25 band reflecting filters provided such that the distance therebetween becomes the resonator length for a light beam of 1.25 μm band, laser oscillation at 1.25 μm band is produced within the ER doped fiber. Thereby, stimulated emission of Er atoms excited at a high energy level is allowed to take place, while the transition from a high energy level to the ground level by spontaneous emission is reduced, so that the population at the level $^4I_{13/2}$ corresponding to a wavelength of 1.55 μm band is increased. By such inverted population, a fiber optic amplifier of a wavelength of 1.55 μm band with high amplification efficiency can be provided.

In accordance with another aspect of the present invention, there is provided a fiber optic amplifier for directly amplifying a signal light beam of a wavelength of 1.55 μm band by introducing a pumping light beam of wavelengths larger than 0.8 μm and smaller than 0.98 μm into an optical fiber doped with Yb and Er to thereby excite Yb and allowing a fluorescent light radiated from the excited Yb to be absorbed in Er to thereby excite Er, the fiber optic amplifier comprising a pair of 0.98 μm band reflecting filters disposed at both end portions of the optical fiber such that the distance therebetween becomes the resonator length for a light beam of 0.98 μm band, whereby laser oscillation at 0.98 μm band is produced.

By means of the pair of 0.98 μm band reflecting filters disposed at both end portions of the optical fiber doped with Yb and Er such that the distance therebetween becomes the resonator length for a light beam of a wavelength of 0.98 μm, the most portion of the energy of the pumping light for exciting Yb can be converted through laser oscillation into light of a wavelength of 0.98 μm band, and Er can be efficiently excited by this light.

The above and other objects, features, and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
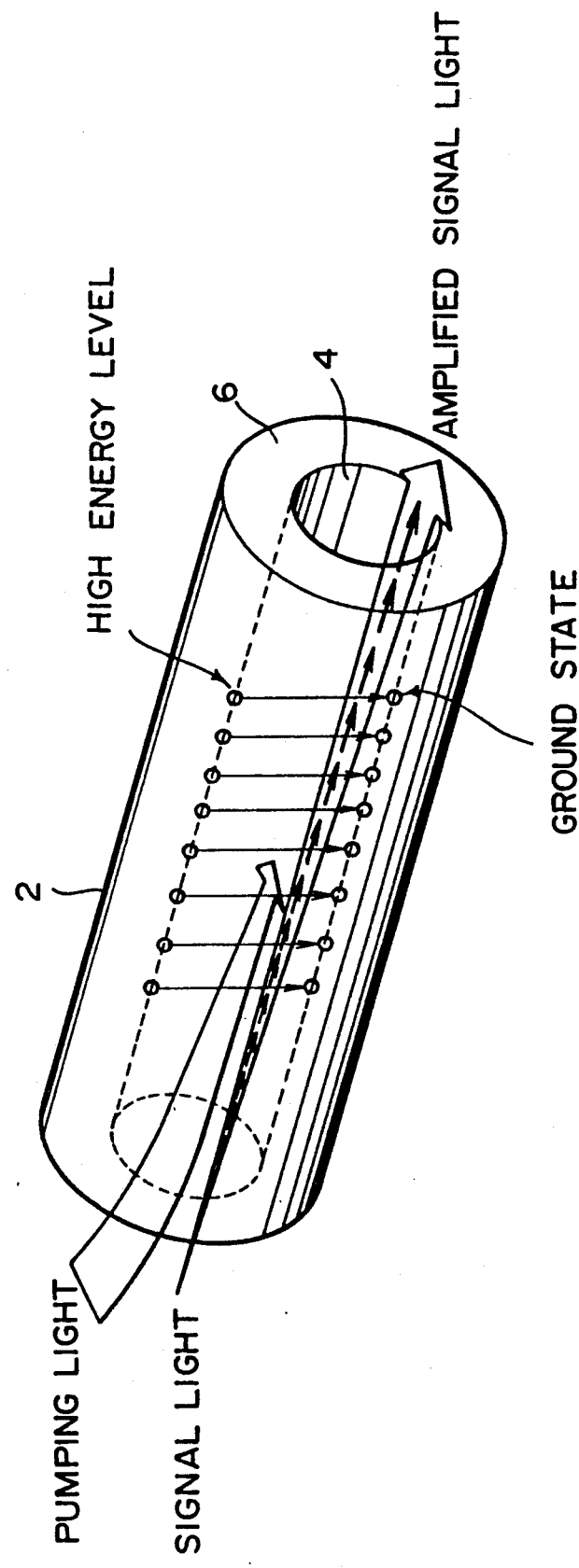
FIG. 1 is a schematic diagram showing the principle of optical amplification by means of an Er doped fiber.
Figure 2:
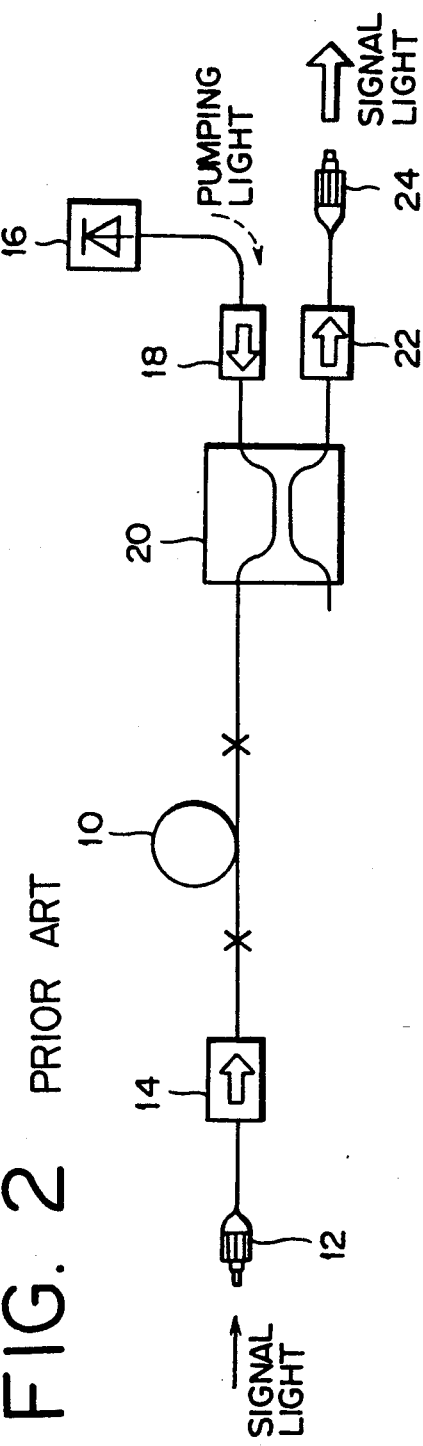
FIG. 2 is a schematic structural diagram of a prior art fiber optic amplifier.
Figure 3:
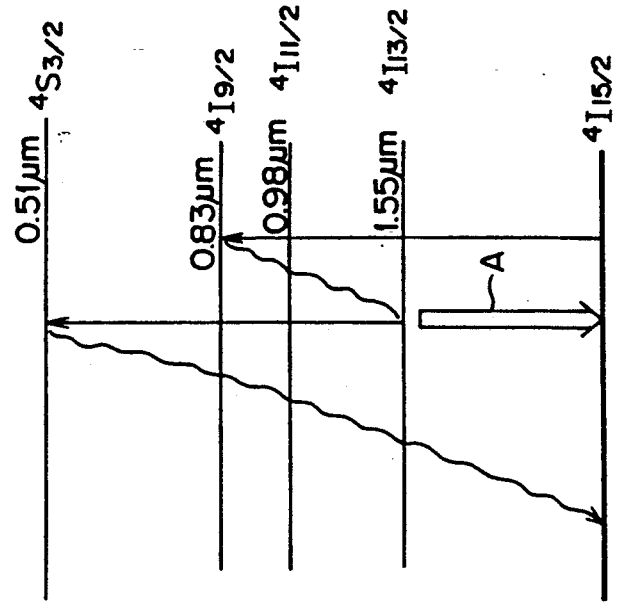
FIG. 3 is an energy level diagram for a prior art example.

Embodiments of the present invention will be described below in detail with reference to the accompanying drawings. In the description of the embodiments, the component parts essentially the same as those in the prior art example shown in FIG. 2 are denoted by like reference numerals and the description thereof will be omitted to avoid duplication.

Figure 4:
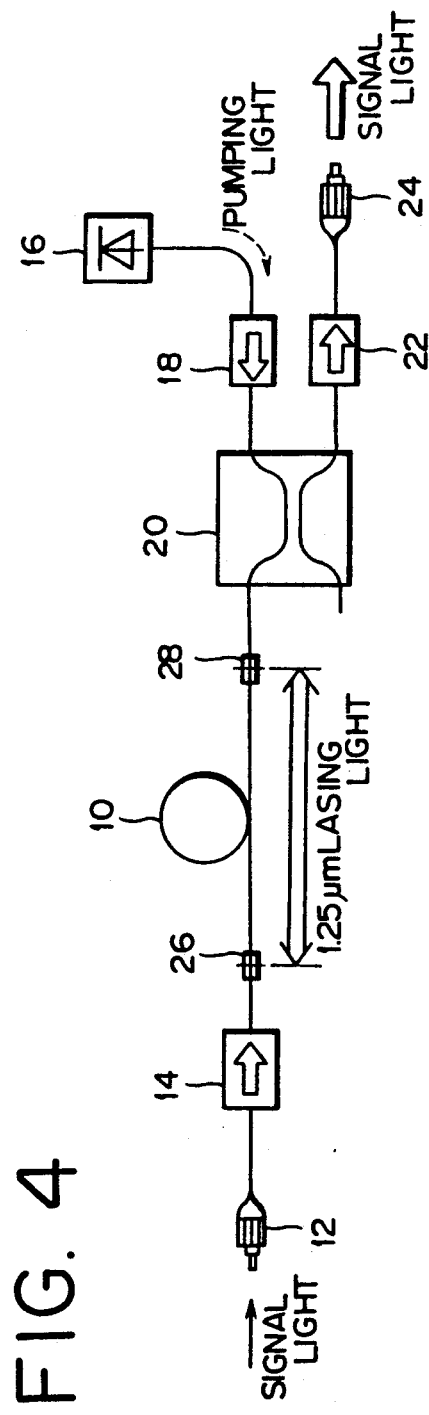
FIG. 4 is a schematic structural diagram showing a first embodiment of the present invention.

FIG. 4 shows an overall structural diagram of a first embodiment of the present invention, in which there are inserted a pair of 1.25 μm reflecting filters 26 and 28 at both ends of an Er doped fiber 10 such that the distance therebetween becomes the resonator length for the light of the wavelength 1.25 μm. Otherwise, the structure is the same as that of the prior art example shown in FIG. 2.

A pumping light beam of a wavelength of 0.83 μm emitted from a pumping light source 16 provided by a semiconductor laser or the like is introduced into the Er doped fiber 10 through an optical isolator 18 and a multiplexing coupler 20 and caused to make laser oscillation there at a wavelength of 1.25 μm by the pair of 1.25 μm band reflecting filters 26 and 28 arranged to have the length of the resonator.

The relative behavior will be described in more detail with reference to an energy level diagram of FIG. 5. By introducing the pumping light of the wavelength 0.83 μm into the Er doped fiber 10, Er atoms at the ground level ($^4I_{15/2}$) are excited to the energy level $^4I_{9/2}$ corresponding to the wavelength 0.83 μm but immediately undergo a transition to the level $^4I_{13/2}$ corresponding to the energy of the wavelength 1.55 μm. The Er atoms at this level are further excited to the level $^4S_{3/2}$ corresponding to the energy of the wavelength 0.51 μm by the energy of the pumping light. In the present embodiment, radiation of the wavelength 1.25 μm is generated within the Er doped fiber 10 by laser oscillation, so that stimulated emission of light takes place and the level of the Er atoms is lowered from the level of $^4S_{3/2}$ to the level of $^4I_{11/2}$. The Er atoms at this energy level change to the level $^4I_{13/2}$ corresponding to the energy of the wavelength 1.55 μm through spontaneous emission, so that the transition from the level $^4S_{3/2}$ to the ground level can be reduced and the population at the level $^4I_{13/2}$ can be increased.

Figure 5:
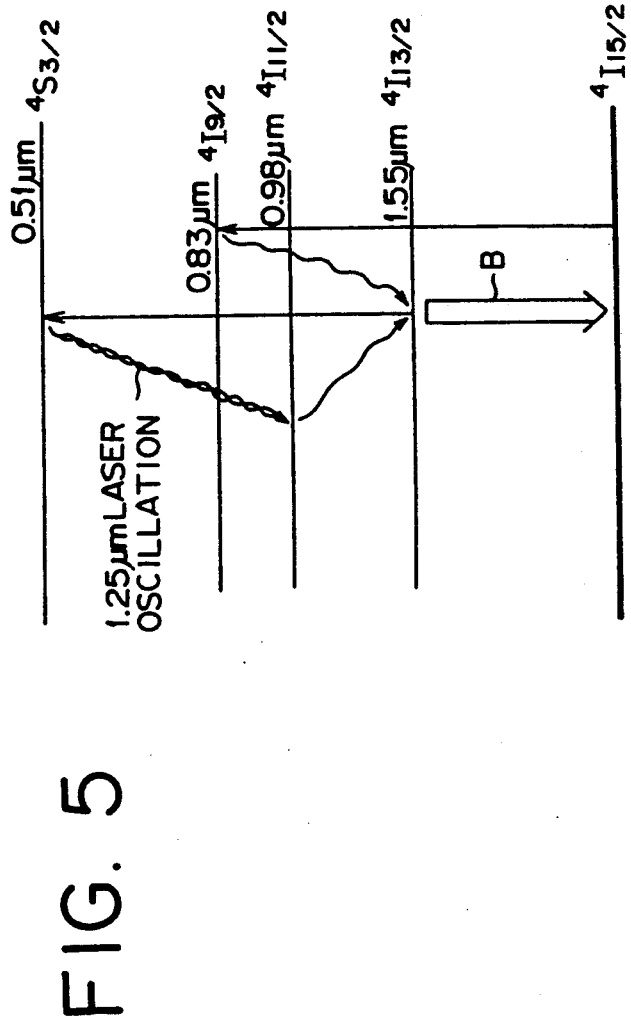
FIG. 5 is a diagram for explaining the energy level related to the first embodiment.

If, into the thus increased population at the level $^4I_{13/2}$ corresponding to the energy of the wavelength 1.55 μm, the signal light of the wavelength 1.55 μm is introduced from the signal light input end 12 and through the optical isolator 14, stimulated emission of radiation of the wavelength of 1.55 μm as indicated by the arrow B in FIG. 5 takes place, whereby the signal light is effectively amplified and emitted from the signal light output end 24 through the multiplexing coupler 20 and the optical isolator 22.

In the present embodiment, since the pumping light is introduced into the Er doped fiber 10 from the opposite direction to that of the signal light, the pumping light is cut off by the optical isolator 14 and hence does not adversely affect the light source such as a semiconductor laser on the side of the signal light input end 12.

Figure 6:
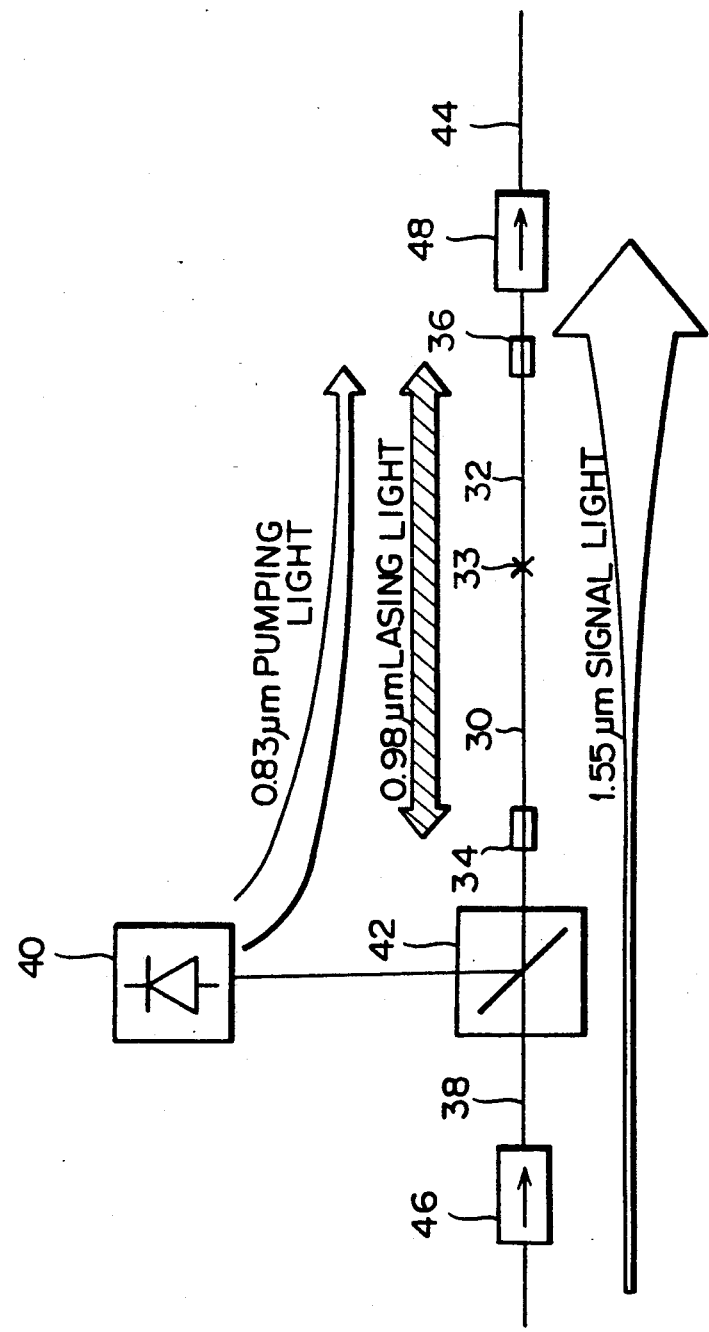
FIG. 6 is a schematic structural diagram showing a second embodiment of the present invention.

Referring to FIG. 6, there is shown a schematic structural diagram of a second embodiment of the present invention. An optical fiber 30 having its core doped with Yb and an optical fiber having its core doped with Er is joined by splicing at the portion denoted by reference numeral 33. At the end portion upstream the Yb doped fiber 30 and at the end portion downstream the Er doped fiber 32, there are inserted 0.98 μm band reflecting filters 34 and 36 with the distance between both the filters set to the resonator length for a light beam of a wavelength of 0.98 μm.

Reference numeral 38 denotes an optical fiber on the inlet side with an optical isolator 46 inserted therein. Reference numeral 40 denotes a pumping light source constituted of a semiconductor laser emitting the pumping light of a wavelength of 0.83 μm. A signal light beam of a wavelength of 1.55 μm band input through the optical fiber 38 on the inlet side and the pumping light of the wavelength 0.83 μm from the pumping light source 40 are combined by the multiplexing coupler 42. The Er doped fiber 32 is connected with the optical fiber on the outlet side 44, and this optical fiber on the outlet side 44 is provided with an optical isolator 48 inserted therein.

Figure 7:
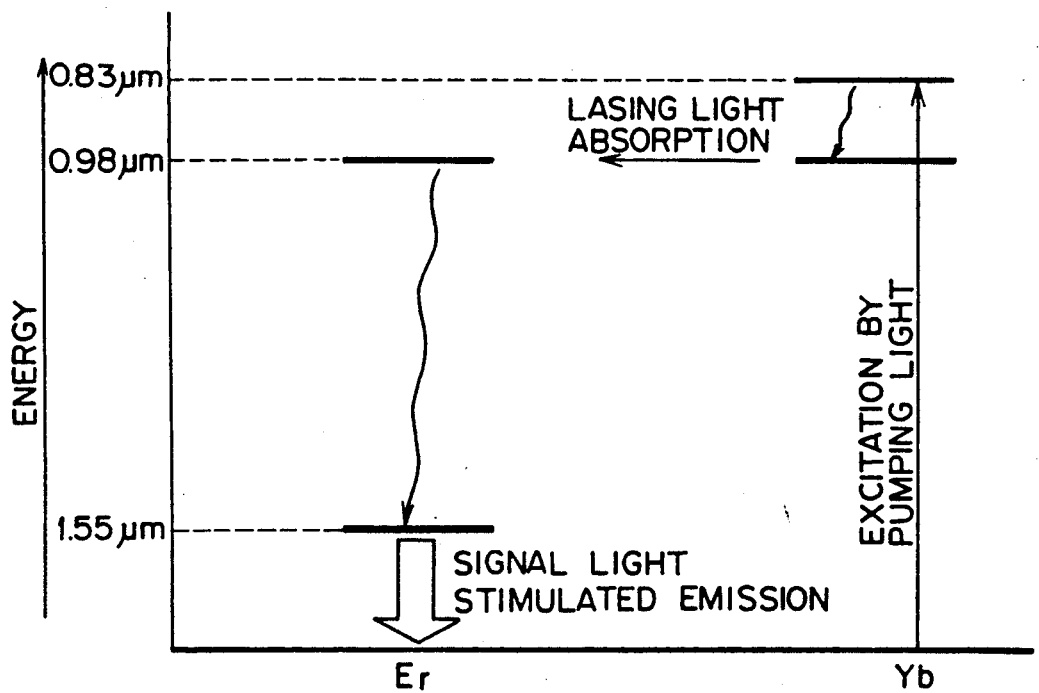
FIG. 7 is an energy level diagram related to the second embodiment.

The pumping light of the wavelength 0.83 μm from the pumping light source 40 is introduced, through the multiplexing coupler 42, into the Yb doped fiber 30 and the Er doped fiber 32 joined by splicing. As shown in the energy level diagram of FIG. 7, when the pumping light of the wavelength 0.83 μm is introduced into the Yb doped fiber 30, Yb atoms are excited to the energy level of 0.83 μm, but since this energy level is unstable, they undergo transition to a lower energy level generating fluorescent light including the wavelength 0.98 μm.

Of the fluorescent light, that of the wavelength 0.98 μm is amplified by the laser resonator constructed of the 0.98 μm band reflecting filters 34 and 36 to cause laser oscillation and introduced into the Er doped fiber 32. The laser beam is absorbed by ER atoms to thereby excite the Er atoms to the energy level of 0.98 μm, but since this energy level is unstable, they immediately undergo transition to the energy level of 1.55 μm, and thus, Er atoms at this level are increased and the state of population inversion is brought about between this level and the ground level.

In such state, if the signal light of the wavelength 1.55 μm is introduced into the Er doped fiber 32 through the optical isolator 46, the multiplexing coupler 42, the filter 34 and the Yb doped fiber 30, the signal light is progressively amplified as it passes through the Er doped fiber 32 and emitted into the optical fiber 44 on the outlet side through the filter 36 and the optical isolator 48.

In the second embodiment, it is made possible to convert the pumping light beam of the wavelength 0.83 μm emitted from the pumping light source 40 into a beam of the wavelength 0.98 μm effectively by means of laser osciallation, and hence effective utilization of the energy of the pumping light of the wavelength 0.83 μm emitted from the pumping light source 40 can be achieved.

Figure 8:
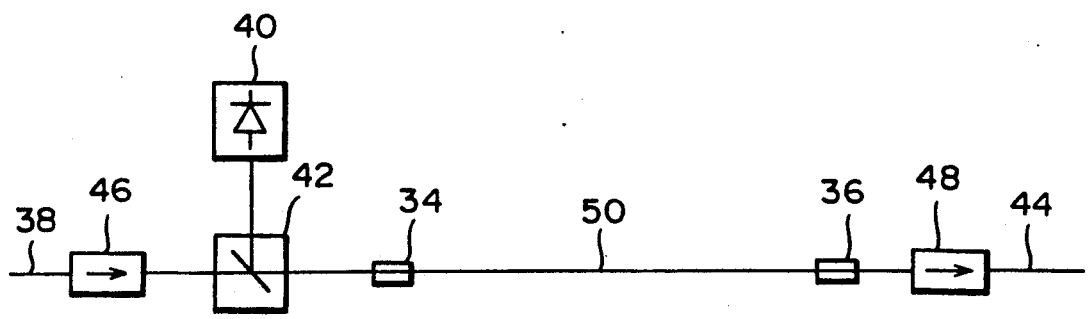
FIG. 8 is a schematic structural diagram showing a third embodiment of the present invention.

Referring now to FIG. 8, there is shown a schematic structural diagram of a third embodiment of the present invention. Component parts corresponding to those in the above described second embodiment are denoted by like reference numerals and explanation of the same is omitted. In the present embodiment, a doped fiber 50 with its core simultaneously doped with Yb and Er is used and, at both end portions of the doped fiber 50, there are inserted a pair of 0.98 μm band reflecting filters 34 and 36 such that the distance therebetween is set to be the resonator length for light of the wavelength 0.98 μm. Since the structure of the present embodiment other than that described above is the same as the structure of the second embodiment shown in FIG. 6, the explanation of the same is omitted.

What is claimed is:

1. A fiber optic amplifier for directly amplifying a signal light beam of a wavelength of 1.55 μm band by introducing a pumping light beam of a wavelength of 0.8 μm band into an optical fiber doped with Er, said fiber optic amplifier comprising:
    an optical fiber doped with Er;
    means for coupling a signal light beam of a wavelength of 1.55 μm band to said optical fiber;
    means for coupling a pumping light beam of a wavelength of 0.8 μm band to said optical fiber; and
    a pair of 1.25 μm band reflecting filters disposed at both end portions of said optical fiber such that the distance therebetween becomes the resonator length for a light beam of 1.25 μm band,
    whereby laser oscillation at 1.25 μm band is produced so that the energy level of Er in the excited state is lowered.

2. A fiber optic amplifier according to claim 1, wherein the signal light beam and the pumping light beam are introduced into said Er doped optical fiber from its opposite directions.

3. A fiber optic amplifier according to claim 2, wherein the signal light beam and the pumping light beam are introduced into said Er doped optical fiber through respective optical isolators.

4. A fiber optic amplifier for directly amplifying a signal light beam of a wavelength of 1.55 μm band by introducing a pumping light beam of wavelengths larger than 0.8 μm and smaller than 0.98 μm into an optical fiber doped with Yb and Er to thereby excite Yb and allowing a fluorescent light radiated from said excited Yb to be absorbed in Er to thereby excite Er, said fiber optic amplifier comprising:
    an optical fiber doped with Yb and Er;
    means for coupling a signal light beam of a wavelength of 1.55 μm band to said optical fiber;
    means for coupling a pumping light beam of wavelengths larger than 0.8 μm and smaller than 0.98 μm to said optical fiber; and
    a pair of 0.98 μm band reflecting filters disposed at both end portions of said optical fiber such that the distance therebetween becomes the resonator length for a light beam of 0.98 μm band,
    whereby laser oscillation at 0.98 μm band is produced.

5. A fiber optic amplifier according to claim 4, wherein said optical fiber comprises a first optical fiber doped with Yb and a second optical fiber doped with Er joined by splicing to said first optical fiber, and wherein said first optical fiber is disposed on the upstream side with respect to the propagating direction of the signal light beam.

6. A fiber optic amplifier according to claim 4, further comprising a first optical isolator inserted in the light transmission line at the upstream side of said optical fiber and a second optical isolator inserted in the light transmission line at the downstream side of said optical fiber.

7. A fiber optic amplifier for directly amplifying a signal light beam of a wavelength of 1.55 μm band by introducing a pumping light beam of a wavelength of 0.8 μm band into an optical fiber doped with Er, said fiber optic amplifier comprising:
   a pair of 1.25 μm band reflecting filters disposed at both end portions of said optical fiber such that the distance therebetween becomes the resonator length for a light beam of 1.25 μm band,
   whereby laser oscillation at 1.25 μm band is produced so that the energy level of Er in the excited state is lowered,
   wherein the signal light beam and the pumping light bean are introduced into said Er doped optical fiber from its opposite directions; and
   wherein the signal light beam and the pumping light beam are introduced into said Er doped optical fiber through respective optical isolators.

8. A fiber optic amplifier for directly amplifying a signal light beam of a wavelength of 1.55 μm band by introducing a pumping light beam of wavelengths larger than 0.8 μm and smaller than 0.98 μm into an optical fiber doped with Yb and Er to thereby excite Yb and allowing a fluorescent light radiated from said excited Yb to be absorbed in Er to thereby excite Er, said fiber optic amplifier comprising:
   a pair of 0.98 μm band reflecting filters disposed at both end portions of said optical fiber such that the distance therebetween becomes the resonator length for a light beam of 0.98 μm band, whereby laser oscillation at 0.98 μm band is produced,
   a first optical isolator inserted in the light transmission line at an upstream side of said optical fiber, and
   a second optical isolator inserted in the light transmission line at a downstream side of said optical fiber.

* * * * *